United States Patent [19]

Worth

[11] Patent Number: 4,729,043
[45] Date of Patent: Mar. 1, 1988

[54] DIGITAL INFORMATION STORAGE AND RETRIEVAL USING VIDEO SIGNALS

[75] Inventor: Joseph P. Worth, Tinton Falls, N.J.

[73] Assignee: American Telephone and Telegraph Company, AT&T Bell Laboratories, Murray Hill, N.J.

[21] Appl. No.: 807,808

[22] Filed: Dec. 11, 1985

[51] Int. Cl.$^4$ ........................... G11B 7/00; H04N 5/76
[52] U.S. Cl. ....................................... 358/342; 360/39; 360/33.1; 360/40; 360/48; 360/53; 369/32; 369/59; 371/37; 371/38; 371/39
[58] Field of Search ............... 358/335, 342; 360/33.1, 360/39, 40, 48, 53; 369/32, 59, 33; 371/30, 37, 38, 39, 40, 50

[56] References Cited

U.S. PATENT DOCUMENTS

| | | | |
|---|---|---|---|
| 3,573,766 | 4/1972 | Perkins . | |
| 3,760,277 | 9/1973 | Whang . | |
| 4,562,577 | 12/1985 | Glover et al. | 369/32 X |
| 4,564,945 | 1/1986 | Glover et al. | 371/38 |
| 4,587,643 | 5/1986 | Monen et al. | 369/32 |
| 4,607,367 | 8/1986 | Ive et al. | 371/37 |
| 4,633,471 | 12/1986 | Pereva et al. | 371/38 |
| 4,680,647 | 7/1987 | Moriyama | 358/343 |
| 4,697,167 | 9/1987 | O'Keefe et al. | 340/347 DD |

FOREIGN PATENT DOCUMENTS

| | | |
|---|---|---|
| 0103248 | 3/1984 | European Pat. Off. . |
| 0119657 | 9/1984 | European Pat. Off. . |
| 0127382 | 12/1984 | European Pat. Off. . |
| 3227373 | 7/1983 | Fed. Rep. of Germany . |
| 2527818 | 12/1983 | France . |
| 57-11564 | 1/1982 | Japan . |
| 57-93756 | 1/1982 | Japan . |

OTHER PUBLICATIONS

Electronics & Wireless World, vol. 91, No. 1592, Jun. 1985, pp. 80–82.
"Philips Compact Disc Read Only Memory," Philips Compact Disc ROM Group.
"Error Correction and Concealment in the Compact Disc System," H. Hoeve et al., Philips Tech. Rev., vol. 40, No. 6, (1982), pp. 166–173.
"ICs for Compact Disc Decoders," J. Matull, Electronic Components and Applications, vol. 4, No. 3, (May 1982), pp. 130–141.
"An Integrated Approach to CD Players," J. Nijhof, Electronic Components and Applications, vol. 6, No. 4, 1984, pp. 209–222.

Primary Examiner—Robert L. Richardson
Attorney, Agent, or Firm—Henry T. Brendzel

[57] ABSTRACT

A method and apparatus for carrying digital information in video signals onto the recording format of audio compact disc (CD) systems. Input signals are divided into 8-bit samples and groups of thirty-three samples are treated as a frame. Upon encoding in accordance with the CD format, the frame is made to contain 576 bits which are converted to one hundred ninety-two 3-bit samples. The 3-bit samples are converted to analog levels and those analog levels comprise the video signals. Such a video signal can advantageously be stored in a video disc with exactly one frame of digital data being contained in the video line and stored in one track of the disc. In retrieving the information, the CD format sync code is detected and augmented, and the video line is fed to circuitry that decodes signals having the standard CD format.

13 Claims, 4 Drawing Figures

DIGITAL INFORMATION STORAGE AND RETRIEVAL USING VIDEO SIGNALS

BACKGROUND OF THE INVENTION

This relates to video signals and, more particularly, to a system and a method for employing video signals to store and retrieve digital information; with the storage medium being transitory, such as a transmission cable, or permanent, such as video discs.

Generally, analog video signals are transmitted and stored with the same format. The storing medium most often used is magnetic tape, but the storage of both still and moving pictures on video discs has been a long-standing goal. The present commercially available formats are largely the result of work begun by Philips and RCA in the middle 1960's. Although many disc storage approaches exist for special purpose applications, only three presently seek mass market acceptance. These are the RCA CED (Capacitance Electronic Disc) Selecta Vision system, the Philips Laser Vision system, used also by Pioneer and others, and the VHD (Video High Density) system developed by the Japan Victor Corp., used also by GE. The basic approach of all video disc systems is the same as that of the phonograph record; i.e., information is recorded on the disc in a spiral track and reproduced by a read-head which moves radially across the spinning disc. The various systems differ as to how the information is stored on the disc surface and what method is used to recover it.

The Philips system, for example, uses a disc which is a plastic "sandwich" consisting of transparent covering over the information bearing base. The base has a very thin aluminized coating whose reflectance variations provide the desired output signal. Two such structures are glued back-to-back to form a two-sided disc. The original master is made by writing a pattern onto a special surface with a high-power laser. High-volume duplicates are made from the master by stamping techniques not unlike those used for reproducing LP phonograph records. The disc rotates at 1800 rpm during playback and must be manually turned over to play both sides.

On each disc, information is stored in a spiral track of pits which are constant in width and depth (400 nm and 110 nm, respectively) but variable in length and spacing (average length=640 nm). On the standard 30 cm disc there are 54,000 turns to the spiral, which provide 30 minutes of continuous program material. Normal play is from inside out, thus allowing a common starting point for discs of varying diameter.

During recording a standard NTSC video signal frequency modulates a carrier with a modulation index such that 7.6 MHz corresponds to sync tip, 8.1 MHz to blanking and 9.3 MHz to peak white. Simultaneously, two wide band (20 KHz) audio signals frequency modulate carriers of 2.3 and 2.81 MHz. The three signals are combined (viz., the modulated audio waves are impressed onto the clipped FM video signal by symmetrical double edge pulse width modulation) and the composite signal then drives the recording laser.

During playback, the signal read from the disc is filtered to separate audio and video components which are individually demodulated. The 30 rps disc rotation means that exactly one video frame is recorded per revolution. This facilitates still frame playback, which is accomplished by causing the read beam to jump back one track at the end of a frame.

Video discs have been used extensively for the purpose for which they were designed, to wit, recording and playing video information. Recently, however, there has been a rapidly growing interest in using video disc technology as a new, dynamically interactive way of presenting material now contained in books, encyclopedias, magazines, catalogs, instruction manuals, etc. Video discs offer a unique set of characteristics for this purpose. They have a very high information storage density (roughly 50 times that of magnetic materials), rapid random access of addressable information, low cost mass produced copies, and relatively low cost playback equipment. By interfacing a video disc player and associated TV display to a computer, stored audio-/visual data can be accessed interactively in a variety of user-friendly ways, such as in video games or menu-driven retrieval and/or control processes.

Heretofore, even in applications of "information" storage, video information has been stored in an analog fashion using NTSC or PAL formats. The audio signals (stereo) in those systems are frequency modulated and added to the modulated video signal. More recently, some work has been done on digital audio modulation. For example, K. A. S. Immink et al. reported at the 74th Convention of the Audio Engineering Society (October 1983) on a system for recording digital audio with the LaserVision analog video system. In their system, the digital audio is converted to the Compact Disc Digital Audio System format (CD format). Then it is passed through a low pass filter (having a cutoff frequency of approximately 1.75 MHz), pre-emphasized, and applied to the pulse width modulation input of the video modulator.

This dual format has a number of disadvantages and limitations. The most serious is the interference between the audio and video spectra and the loss of high frequency detail in the video spectrum. This occurs because, in order to accommodate the spectrum of the digital audio the video spectrum must be band limited. In addition, there is the complexity involved in recording both formats simultaneously. It may be noted that the original application of recording in both formats on a video disc was indeed to provide high quality (CD) audio at the expense of the video image.

Despite the great potential of interactive video disc players, commercially available versions have important limitations. In particular, audio accompaniment to the video display is possible only in the standard thirty frame/second playback mode and not with other modes such as slow motion or still frame. Also, the frequent employment of the still frame mode and the close viewing distance common to interactive terminal use both serve to magnify the imperfections of the universally used NTSC video format.

Other attempts of analog recording of digital information within video include methods to encode digital bit patterns in an analog muti-level NRZ format. The specific formats employed are proprietary but, to the extent known, they are nonstandard and, in general, they lack error correction, recovery and control, immunity from burst errors and are characterized by a poor signal-to-noise ratio due to the use of many analog levels.

In view of these problems and other considerations, it is an object of my invention to employ a robust method for encoding digital information onto video signals.

It is another object of my invention to encode digital information within a standard video signal format.

It is still another object of our invention to employ a recording format that requires a minimum of hardware, permitting the use of a robust recording formula without an attendant high cost of playback equipment.

SUMMARY OF THE INVENTION

These and other objects of the invention are realized by adopting the CD format used in audio compact disc systems and applying it to digital information to be stored within video signals. More specifically, an input signal comprising a stream of bits is divided into 8-bit samples, and groups of 33 samples are treated as a frame. Upon encoding in accordance with the CD format, the frame is made to contain 576 bits which are converted to One hundred nine-two-3-bit samples. The 3-bit samples are converted to analog levels and those analog levels are concatenated to form a video signal that is transmitted, or recorded onto a video disc in conventional manner. This approach permits the storage of exactly one frame of digital information in each video line. In retrieving the information, the CD format sync code is detected and augmented, and the video line is fed to circuitry that decodes signals having the standard CD format. The result is the original digital bit stream.

DETAILED DESCRIPTION

Conventional Compact Disc Format

Figure 1:
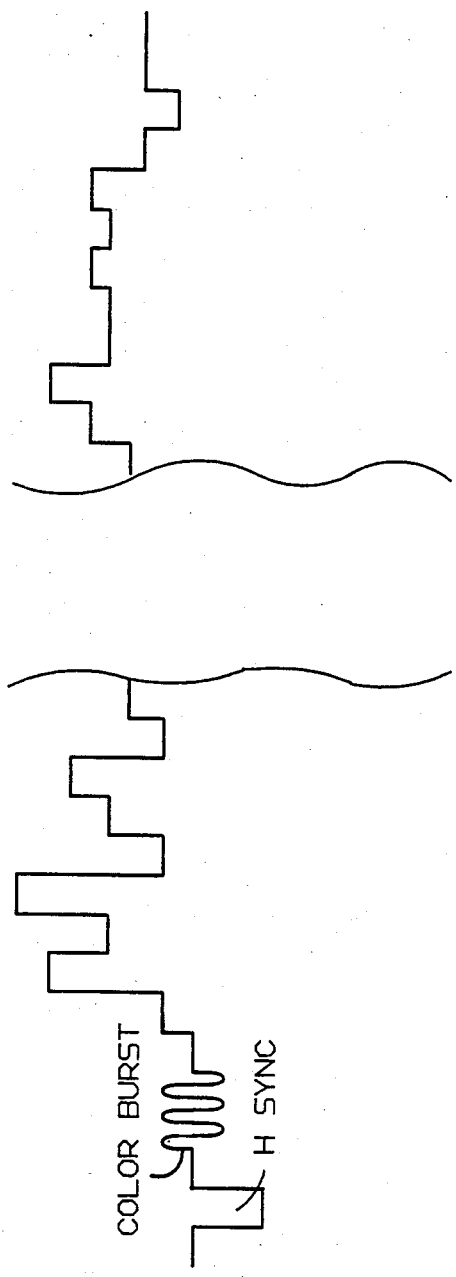
FIG. 1 illustrates a typical video line carrying a signal in accordance with the principles of this invention.

In the context of this disclosure and the claims appended hereto, "CD format" refers to the signal format currently used in digital audio compact disc systems. Because this format is closely related to my format, the following reviews the standard CD format as it is employed in recording digital audio information onto compact discs.

Electrically, CD digital information is recorded in blocks of 98 frames, with 588 bits per frame. Each frame consists of twenty-four 8-bit information symbols, one 8-bit subcode control word, eight 8-bit error correcting code words, and one 24-bit sync field indicating the start of the frame.

The requirements of a code for an optical audio disc are that the bit block be recoverable from the signal, that there should be low spectral power at low frequencies, and that there should be low error propagation. Minimizing the low frequency content in the data (DC to 20 KHz) is important because this is the frequency range of the servo contol for the disc and read head. To achieve these objectives, the thirty-three 8-bit symbols (all but the sync field) are modulated by an Eight to Fourteen Modulation (EFM) scheme whose purpose is to ensure a minimum of two 0s and a maximum of ten 0s between a 0 to 1 transition or a 1 to 0 transition in the recorded data. There are 267 combinations of fourteen bits which satisfy the run length constraint of at least two 0s and a maximum of ten 0s. Of these 267 patterns, there are ten patterns that could introduce difficulties in concatenating the symbols and, therefore, they are omitted. One additional pattern is omitted at random, and a final pattern not used elsewhere is employed within the subcode. this leaves exactly 256 patterns for the data, which corresponds exactly to the number of combinations attainable from an 8-bit code. A reasonably good description of the EFM modulation is found in "Philips Compact Disc Read Only Memory," Philips Compact Disc ROM Group, technical overview pamphlet.

The 14-bit blocks cannot, however, be concatenated without potentially violating the constraint on the permissible number of consecutive 0s. Therefore, three merging bits are appended (e.g., 010) to each of the symbols. This results in a total of 588 bits consisting of $(24+3)$ sync bits plus $(33\times(14+3))$ symbol bits. The merging bits also reduce the DC content of the recorded information. The sync field is constructed from two maximum run length sequences (maximum number of zeros) and the resulting bit pattern is 40010002 (octal).

In the subcode control word, each bit in the original 8-bit subcode word corresponds to a channel (P, Q, R, S, T, U, V, W), and each channel extends for the 98 frames of a block before repeating. Presently, only the P and Q channels are used in the CD format.

The eight Error Correction Code (ECC) bytes are combined in a two level Reed-Solomon code; with one level being a (32, 28) code and the other level being a (28, 24) code. More particularly, the code employed is the Cross Interleave Reed-Solomon Code (CIRC), with a very specific interleaving pattern within the block of frames. The interleaving helps in the recovery of information even in situations of fairly substantial loss of data. A discussion of CIRC is found in the aforementioned Philips pamphlet, as well as in "Error Correction and Concealment in the Compact Disc System," H. Hoeve et al., Philips Tech. Rev. Vol. 40, No. 6, (1982) pp. 157–164.

New Video Format

The signal format of my invention incorporates the CD format into the standard NTSC RS-170A (color) or RS-170 (monochrome) composite video timing format. By employing this new format, digital information can be encoded onto video signals, transmitted as a conventional TV signal and employed almost immediately (TV reception) or stored on tape or video disc. The advantage which results from the tailoring of the CD format to conventional video formats is in the robust error correction that is afforded by such encoding. This advantage is particularly beneficial when storage of large volumes of data is desired, particularly on video discs.

In accordance with the NTSC video timing standards, an active video line has time for 192 cycles of color subcarrier with a total of 227.5 cycles of subcarrier per RS-170A line. The sampling clock is locked to either the color subcarrier, if color is present, or to the horizontal sync pulses, if monochrome only is present. In accordance with the principles of my invention each of the 192 sample windows contains a 3-bit sample encoded in a representative analog level.

With an arrangement as specified above, the total number of bits encoded per active line is 576. This is 12 bits short of the required 588 bits per CD frame and, hence, a modification must be incorporated. In accordance with my invention, the standard CD sync field is reduced from 27 bits to 15 bits. Of course, this reduced 15-bit sync pattern must be unique, and I construct it by concatenating a sequence of the allowed signal codes that violates the EFM run length constraints. It would be recognized by a skilled artisan that only a limited number of 15-bit sync patterns may be constructed that satisfy these conditions. When recovering signal levels from the video signal, this unique start pattern is detected and replaced by the correct and full 27-bit CD frame sync lead-in pattern.

On first blush it would appear that the 3-bit samples use eight analog levels and would thus be very difficult to encode and decode, especially in the presence of noise (either in the video channel or in the actual recording). This is not the case, however, because using the EFM process as employed in the CD format restricts the actual bit patterns in the CD format stream and results in needing only four of the eight 3-bit patterns. Specifically, bit patterns 011, 101, 110, 111 never occur in the CD format serial bit stream because of the run length requirement of a minimum of two 0s and a maximum of ten 0s between transitions. Also, there is only a limited number of ordering or arrangement patterns for the four allowed analog levels which are the binary bit patterns 001, 010, 100, and 000, and that number is four factorial (4!). Of these 24 orderings of the allowed levels only a few are optimal, depending on the 3-bit pattern statistics of the digital information being recorded.

With the above in mind, a unique CD frame start pattern of 15 bits (five 3-bit samples) is created, in accordance with the principles of my invention by choosing some combination from the "allowed" bit patterns that also would not occur naturally in the CD bit stream; e.g., 000 010 100 000 010 (the sub-pattern, 101, created by the catenation of the second and third 3-bit groupings is forbidden). It might be advantageous to have the last six bits of the sync pattern be 000 010 because these form the last six bits of the actual CD format frame sync pattern. With such a selection, only 21 bits would need to be inserted upon recognition of the sync pattern.

FIG. 1 depicts a segment of a video line signal carrying a signal created as described above, with the representative levels and their corresponding bit patterns shown. Of course, there are a number of possible orderings of the levels and their representative bit values. In FIG. 1, the ordering selected has the lowest symbol value (000) correspond to the lowest analog level and the highest symbol value (100) correspond to the highest analog level.

Implementation

Figure 2:
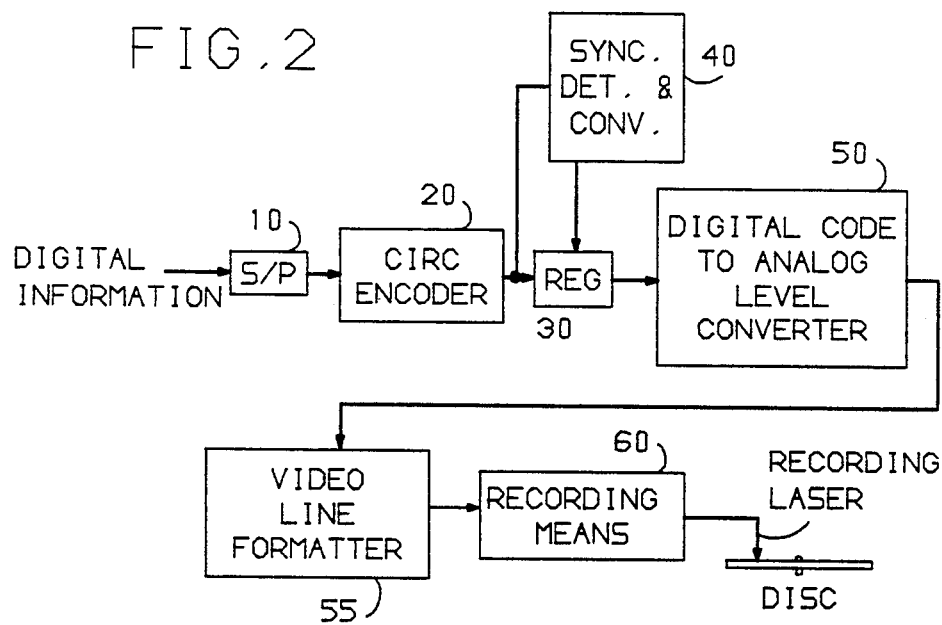
FIG. 2 describes a system for recording digital information onto a video disc in accordance with the CD format of this invention.

A hardware implementation of an encoder for formatting digital information in accordance with the principles of my invention and storing it on a video disc is shown in FIG. 2. Digital information is applied serially to serial-to-parallel converter 10. Therein, the information is grouped into 8-bit symbols and applied to CIRC encoder 20. Encoder 20 is a conventional encoder for converting digital signals to compact disc format. Within encoder 20, a block of 98 frames, each containing twenty-four 8-bit symbols, is handled as a unit for purposes of subcode generation. In each frame, the sets of twenty-four 8-bit symbols are protected by two levels of error correction codes. A first level of four Reed-Solomon error correction codeis generated directly from the 24 symbols, resulting in a total of twenty-four 8-bit symbols per frame. Groups of 28 symbols are then interleaved and further protected by a second level of four Reed-Solomon error correction codes. This results in groups of thirty-two 8-bit symbols. To these 32 symbols the 8-bit subcode is added and the EFM process is applied. The 24-bit sync pattern is added to the total, three merging bits are added to each of the 14-bit symbols and to the sync pattern, yielding an overall total of 588 bits per frame.

Encoder 20 can be purchased commercially from any concern that engages in "mastering" of audio and ROM CD discs; such as 3M, Philips, Sony, etc. Electronic Components and Applications, Vol. 4, No. 3, (May 1982), pp. 130–141, and in "An Integrated Approach to CD Players," J. Nijhof, Electronic Components and Applications, Vol. 6, No. 4, pp. 209–222.

The output bits of encoder 20 are applied to register 30 and to sync detector and converter 40. Element 40 detects the appearance of the 27-bit sync code and replaces it with a 15-bit sync code selected in accordance with the above description.

The modified sync code is concatenated to the output of encoder 20 within register 30 and applied to converter 50. Converter 50 is a digital-code-to-analog-level converter that conforms to the selected conversion approach. For the approach described above, a conventional D/A converter suffices.

The output of converter 50 is applied to video line formatter 55 which converts the output of converter 50 into the video signal format shown in FIG. 1. Most simply, formatter 55 contains memory and a minimal amount of logic circuitry that converts the steady stream of signals from converter 50 into a signal that has gaps at appropriate intervals where the horizontal sync pulses and other components of the FIG. 1 video signal are inserted. The output of formatter 55 may be applied to a transmission line, but in FIG. 2 it is applied to conventional video disc recording means 60 which modulates the signal and, through a recording laser, imprints the video signal onto a video disc.

Although the implementation of converter 50 and formatter 55 is described above, a commercial circuit is available that implements both functions. It is generally referred to as a video frame memory.

Figure 3:
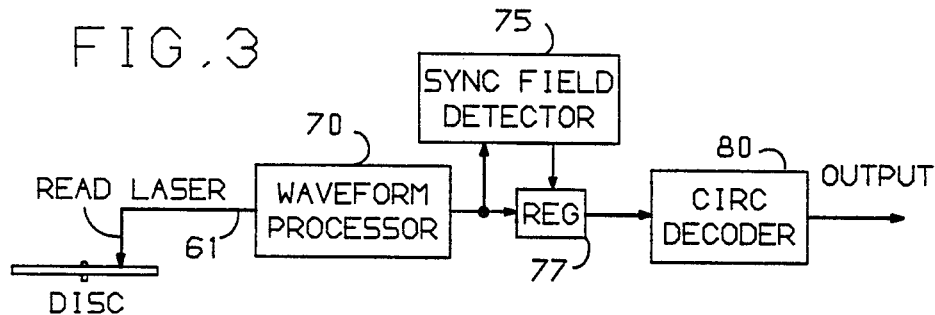
FIG. 3 depicts a system for extracting information from a video disc where the information is formatted in accordance with the principles of this invention.

FIG. 3 depicts a system that accepts signals created in accordance with the disclosed invention and develops therefrom the stored digital information. In FIG. 3 the signals are shown to be derived from a video disc but, of course, in other applications the signal can come from a transmission line or from a receiver such as a conventional television set. The signal, on line 61, is applied to waveform processor 70 where voltage thresholds are applied to the incoming signal to determine the digital codes that are contained on the analog signal. For the conversion approach described above, a commercial video frame grabber may be utilized together with a conventional A/D converter and a frame memory. The output of waveform processor 70 is appied to sync field detector 75 and to register 77. Detector 75 and register 77 perform the inverse function of converter 40 and register 30 in FIG. 2; that is, detector 75 detects the 15-bit sync pulse in the signal, converts it to the standard 27-bit sync code expected by a conventional CD decoder, and insets it as appropriate in register 77 to form a conventional CD formatted signal. That signal is applied to a conventional CD format CIRC decoder 80 which develops the desired digital information.

Timing Considerations

Figure 4:
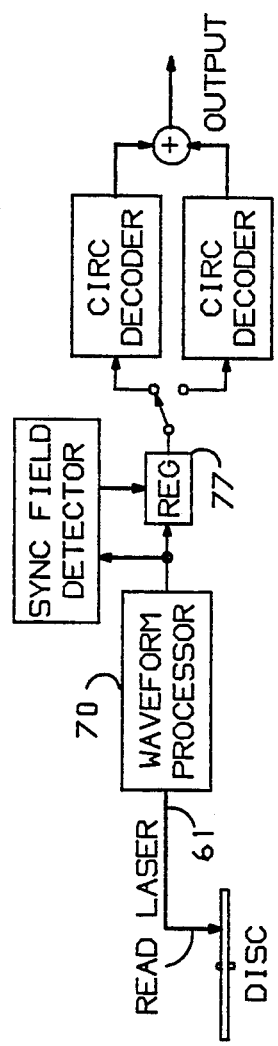
FIG. 4 illustrates a system arrangement for retrieving information from a video disc with decoder hardware designed to be employed in audio CD systems.

As indicated previously, my proposed method contemplates storing a complete CD frame (twenty-four 8-bit words of information) in one video line. A block would take up 98 video lines, and a complete video frame with 490 active lines would store five blocks. A video frame has a 1/30th second rate, which corresponds to 150 blocks per second. Normal CD timing, however, is 75 blocks per second. That means that video signals have a timing arrangement that permits handling bits at twice the rate that normally are handled by the equipment employed in Audio CD systems. Stated differently, if the speed associated with video signals is maintained, the conventional CD format chips cannot be used unless they are shown to be capable of operating at twice the speed at which they operate in audio systems. That is possible, of course, if the design of the commercial chips permits an increase in the operating frequencies, or if the chips are redesigned (or new high speed chips are designed for my specific format). In the alternative, the existing audio CD chips can be employed in conjunction with a reduction (by 50%) in the storage of information. The latter may be achieved by halving the bit storage per video line, by using only every other line for the storage of digital information, or by duplicating the information stored and thereby further improving the reliability of the storage medium. In still another alternative, the slow hardware may be duplicated, with every other line being handled by a separate set of circuits, as shown in FIG. 4 (for a retrieval system).

What is claimed is:

1. A video disc for storing digital information in a signal format comprising:
   a plurality of concatenated video signal lines for storing a predetermined number of bits of said digital information and each beginning with a horizontal sync pulse and followed by a second plurality of analog samples;
   where each of said analog samples within each of said video signal lines represents a derivable multi-bit sequence, and the concatenation of said each derivable multi-bit sequence with derivable multi-bit sequences of adjacent analog samples within each said video signal line forms a frame sequence; and
   where said frame sequence comprises a first and second set of error correction codes and a plurality of message words, with said message words being related to said predetermined number of bits, said first set of error correction codes being related to said predetermined number of bits, and said second set of error correction codes being related to a rearrangement of said predetermined number of bits of a number of said video signal lines.

2. The video disc of claim 1 wherein said first and second sets of error correction codes form a cross-interleaved Reed-Solomon error correction code set.

3. The video disc of claim 1 wherein said frame sequence further comprises a frame synchronization sequence.

4. The video disc of claim 1 wherein said analog samples represent one of four analog values and each of said analog values represents a 3-bit code.

5. The video disc of claim 4 wherein said 3-bit code belongs to the set {000, 001, 010, 100}.

6. The video disc of claim 1 wherein said frame comprises one hundred ninety-two of said analog samples, each representing a 3-bit digital code, and a concatenation of said three bit codes comprises 24 information words with each of said information words being related to different 8-bit segments of said digital information.

7. A video disc for storing digital information by imprinting said information thereon with video frame signals created in accordance with the steps of:
   delineating information frames in said digital information by selecting sequences of a preselected number of multi-bit words;
   appending to each of said information frames a sync sequence and cross-interleaved error correction codes related to said preselected number of multi-bit words of a fixed number of said information frames to develop information frame sequences;
   separating each of said information frame sequences into multi-bit information samples equal in number to the number of samples selected for said video frame signals and converting each of said multi-bit information samples into an analog level, to develop an analog frame signal for each of said information frames; and
   adding video characterization signals to said analog frame signals to develop said video frame signals.

8. A video disc having digital information stored in the arrangement of pits and lands along a track, where the length of said pits and lands is related to the zero crossing of a signal which, when frequency demodulated, is characterized by:
   a plurality of concatenated video signal lines for storing a predetermined number of bits of said digital information and each beginning with a horizontal sync pulse and followed by a second plurality of analog samples;
   where each of said analog samples within each of said video signal lines represents a derivable multi-bit sequence, and the concatenation of said each derivable multi-bit sequence with derivable multi-bit sequences of adjacent analog samples within each of said video signal lines forms a frame sequence; and
   where said frame sequence comprises a first and second set of error correction codes and a plurality of message words, with said message words being related to said predetermined number of bits, said first set of error correction codes being related to said predetermined number of bits, and said second set of error correction codes being related to a rearrangement of said predetermined number of bits of a number of said video signal lines.

9. A method for storing digital information in video lines characterized by horizontal sync pulses and an analog video signal between said sync pulses that contains a predetermined number, I, of sample windows, comprising the steps of:
   selecting frames of NM bits of said digital information, with said NM bits treated as N M-bit input words;
   developing a first set of K1 error correction codes, each having L1 bits, from the sequence of said N input words and developing a second set of K2 error correction codes, each having L2 bits, from a sequence of said N input words derived from a rearrangement of input words of a set plurality of adjacent frames;
   combining said N input words and said K1 and K2 error correction codes with a frame synchronization sequence of L3 bits to develop a sequence of J bits, where $J = NM + K1L1 + K2L2 + L3$, and where M, N, K1, L1, K2, L2, and L3 are integers selected to satisfy the equation J=P1, P being an integer; and converting adjacent P-bit subsequences of said sequence of said J bits into concatenated pulse amplitude modulated analog samples to develop said analog video signal.

10. The method of claim 9, further including a step of modulation before said step of combining, where each of said input words, each of said first set of error correction codes and each of said second set of error correction codes is expanded to satisfy a run length requirement of not less than a first threshold number of consecutive bits of a first value and not more than a second threshold number of consecutive bits of said first value between consecutive bits of a second value; and the values of N, M, K1, L1, K2, L2, and L3 are selected so that the expanded values M', L1' and L2' satisfy the equation J=NM+K1L1'+K2L2'+L3.

11. The method of claim 10 wherein said step of developing error correction codes generates a set of eight cross-interleaved Reed-Solomon error correction codes and said step of modulation adds bits to each of said error correction codes and to each of said input words such that the number of consecutive zeros between consecutive ones is not less than two and not more than ten.

12. A system for retrieving digital information from a video signal characterized by frames of analog samples delineated by horizontal sync pulses, comprising:

retrieval means for deriving said frames of analog samples from said video signal;

threshold means responsive to said retrieval means for converting voltage ranges of said analog samples to multi-bit words;

detection means responsive to said threshold means for discerning a synchronization sequence from among said multi-bit words; and decoder means responsive to said detection means and to said threshold means for extracting said digital information from said multi-bit words through a process that is the inverse of an encoding process that, for each segment of said digital information, develops a first set of error correction codes for said segment of digital information, rearranges the digital information of a fixed plurality of said segments, develops a second set of error correction codes based on digital information found in each segment following the rearrangement, and combines said first set of error correction and said second set of error correction codes with said digital information of said segment.

13. A system for retrieving digital information from a video signal characterized by frames of analog samples delineated by horizontal sync pulses, comprising:

retrieval means for deriving said frames of analog samples from said video signal;

threshold means responsive to said retrieval means for converting voltage ranges of said analog samples to multi-bit words;

detection means responsive to said threshold means for discerning a synchronization sequence from among said multi-bit words; and switch means having one input and more than one output, responsive to said detection means and to said threshold means, for directing said multi-bit words of said threshold means to alternate outputs of said switch means under control of said detection means; and a cross-interleaved Reed-Solomon decoder connected to each of said switch means outputs.

* * * * *